US009152790B1

(12) United States Patent
Glick et al.

(10) Patent No.: US 9,152,790 B1
(45) Date of Patent: Oct. 6, 2015

(54) SYSTEMS AND METHODS FOR DETECTING FRAUDULENT SOFTWARE APPLICATIONS THAT GENERATE MISLEADING NOTIFICATIONS

(75) Inventors: Adam Glick, Culver City, CA (US); Nicholas Graf, Culver City, CA (US); Spencer Smith, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1492 days.

(21) Appl. No.: 12/470,213

(22) Filed: May 21, 2009

(51) Int. Cl.
*G06F 21/56* (2013.01)

(52) U.S. Cl.
CPC .................................. *G06F 21/566* (2013.01)

(58) Field of Classification Search
USPC ............................................................ 726/24
See application file for complete search history.

(56) References Cited

U.S. PATENT DOCUMENTS

| 7,209,916 | B1* | 4/2007 | Seshadri et al. ................. 1/1 |
| 7,831,840 | B1* | 11/2010 | Love et al. ................. 713/189 |
| 7,890,427 | B1* | 2/2011 | Rao et al. ................. 705/51 |
| 2001/0035881 | A1* | 11/2001 | Stoakley et al. ............ 345/772 |
| 2005/0235351 | A1* | 10/2005 | Seltzer et al. ................. 726/14 |
| 2006/0095972 | A1* | 5/2006 | Rogalski ................. 726/26 |
| 2007/0067844 | A1* | 3/2007 | Williamson et al. ............ 726/24 |
| 2008/0046975 | A1* | 2/2008 | Boss et al. ................. 726/4 |
| 2008/0098229 | A1* | 4/2008 | Hartrell et al. ................. 713/176 |
| 2009/0100520 | A1* | 4/2009 | Reasor et al. ................. 726/23 |
| 2009/0113015 | A1* | 4/2009 | Koster ................. 709/207 |

OTHER PUBLICATIONS

"Spyware Quake and SpyQuake2.com Removal Guide," Mar. 2007.*
Nahorney, Ben; "Misleading Applications: faking left, running right"; Aug. 31, 2007; Symantec Corporation; https://forums.symantec.com/t5/Security-Risks/Misleading-Applications-faking-left-running-right/ba-p/306466.
"Misleading Applications—What you need to know"; (accessed on May 20, 2009); Symantec Corporation; http://www.symantec.com/norton/theme.jsp?themeid=mislead.

* cited by examiner

*Primary Examiner* — Andrew Georgandellis
(74) *Attorney, Agent, or Firm* — ALG Intellectual Property, LLC (57) ABSTRACT

A computer-implemented method for detecting fraudulent software applications that generate misleading notifications is disclosed. In one example, such a method may comprise: 1) detecting a notification generated by an application installed on the computing device, 2) accessing criteria for determining, based at least in part on characteristics of the notification, whether the application is trustworthy, 3) determining, by applying the criteria, that the application is untrustworthy, and then 4) performing a security operation on the application. Corresponding systems and computer-readable media are also disclosed.

20 Claims, 6 Drawing Sheets

SYSTEMS AND METHODS FOR DETECTING FRAUDULENT SOFTWARE APPLICATIONS THAT GENERATE MISLEADING NOTIFICATIONS

BACKGROUND

Malicious computer programs ("malware") continue to evolve at an alarming pace. One particularly nefarious form of malware that has experienced tremendous growth is commonly known as a misleading or rogue software application. Misleading applications typically intentionally misrepresent the security status of a user's computer in an attempt to deceive or mislead the user into paying for the fake or simulated removal of malware, security risks, and/or unwanted programs and files.

For example, a misleading application may be installed via a browser exploit or through a social-engineering ruse (such as a fake codec) that tricks a user into installing the application. Once installed, the misleading application may constantly generate taskbar or desktop messages and notifications that suggest that various unwanted computer programs and files (such as viruses or pornographic images) are present on the user's computer. The misleading application may then offer to remove the unwanted items from the user's computer for a fee.

Unfortunately, because these misleading applications do not perform any actual security services, users that pay the fees requested by misleading applications simply pay for nonexistent services. Worse still, the authors of misleading applications may use such a transaction to procure credit and personal information that may be used to commit credit or identity fraud. Misleading applications may also consume system resources, disable system or security-software updates, and/or expose users to additional security threats by lulling users into a false sense of security or by installing additional malware.

Unfortunately, the constant and rapid evolution of malware has made it extremely difficult for security-software programs that employ traditional signature-based technologies to prevent such threats. As such, the instant disclosure identifies a need for systems and methods for reliably and accurately detecting fraudulent applications that generate misleading messages.

SUMMARY

As will be described in greater detail below, the instant disclosure generally relates to systems and methods for detecting fraudulent software applications that generate misleading notifications. In one example, a method for performing such a task may comprise: 1) detecting a notification (such as a notification generated in the taskbar notification area of an operating system) generated by an application installed on a computing device, 2) retrieving or accessing criteria for determining, based on characteristics of the notification and/or the application that generated the notification, whether the application is a fraudulent or misleading application, 3) determining, by applying the criteria, that the application is a fraudulent or misleading application, and then 4) performing a security operation on the application.

Examples of criteria that may be used to determine whether an application represents a fraudulent or misleading application include, without limitation: 1) whether a notification generated by the application contains words or phrases (such as "virus," "warning," and "infected") that are commonly contained in messages generated by fraudulent or misleading applications, 2) whether a notification generated by the application contains a hyperlink to known-untrustworthy websites (e.g., websites that host malicious files or sell pirated or fraudulent software), 3) whether the application generated a notification within a short period of time (e.g., 30 seconds) after the application was installed, 4) whether the application originated from or was created by a potentially untrustworthy source (such as a web browser), 5) whether the application was installed in a location (such as the system directory or a browser directory) that is commonly used by or associated with fraudulent or misleading applications, 6) whether the application or a file associated with the application (e.g., the primary executable file associated with the application) contains at least one data pattern or string that is commonly used by or associated with fraudulent or misleading applications, and 7) whether a digital certificate associated with the application has been signed by a trusted certificate authority (such as MICROSOFT). In some examples, two or more criteria may be combined to form a rule or heuristic.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for detecting software applications that generate misleading messages and notifications in an attempt to defraud computer users. As used herein, the phrases "misleading applications," "fraudulent applications," and "rogue applications" generally refer to software applications or programs that attempt to deceive, mislead, or defraud users into paying for the fake or simulated removal of malware, security risks, and/or unwanted programs and files.

Figure 1:
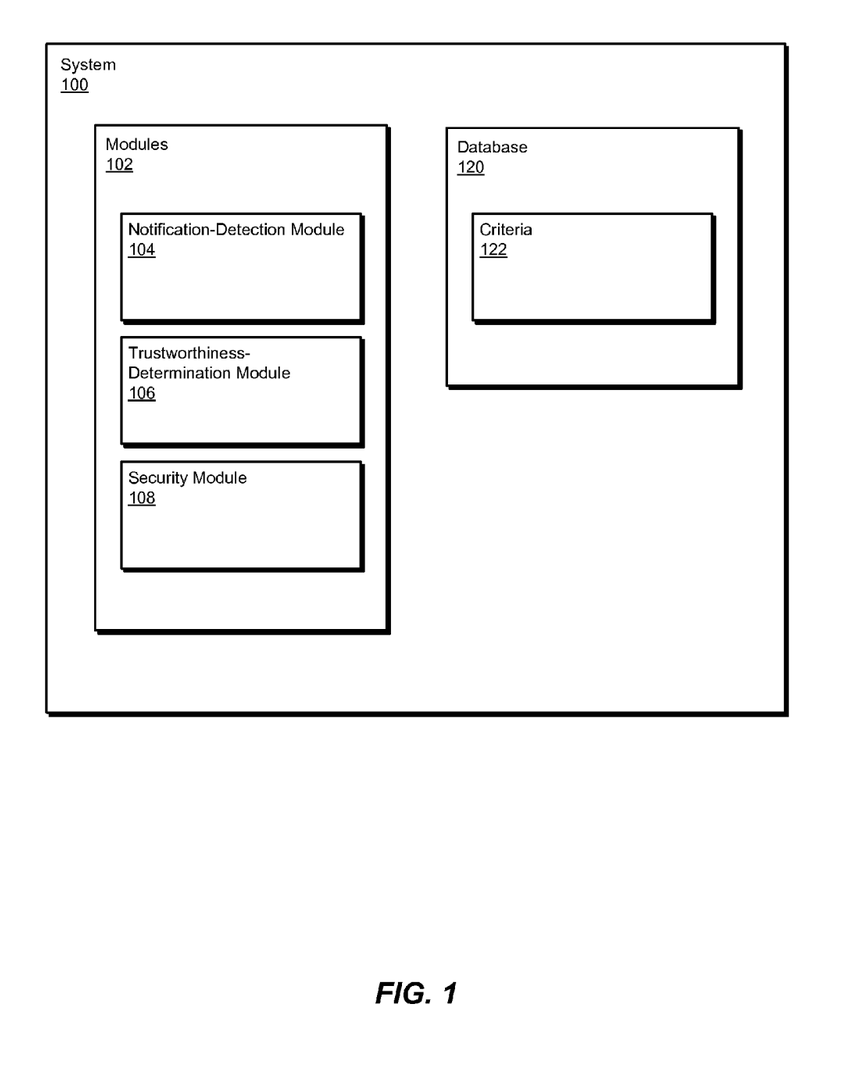
FIG. 1 is a block diagram of an exemplary system for detecting fraudulent software applications that generate misleading notifications according to at least one embodiment.

FIG. 1 is a block diagram of an exemplary system 100 for detecting fraudulent software applications that generate misleading notifications As illustrated in this figure, exemplary system 100 may comprise one or more modules for performing one or more tasks. For example, and as will be explained in greater detail below, exemplary system 100 may comprise a notification-detection module 104 programmed to detect notifications (such as messages generated in the notification area of an operating system's taskbar, sometimes referred to as the "system tray") generated by applications installed on a computing device. Exemplary system 100 may also comprise a trustworthiness-determination module 106 programmed to determine, by applying various criteria to the notification and/or the application that generated the notification, whether the application that generated the notification represents a misleading or fraudulent application.

In addition, and as will be described in greater detail below, exemplary system 100 may comprise a security module 108 programmed to perform security operations on misleading or fraudulent applications. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such computing device 202 in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also comprise a database 120. Database 120 may represent portions of a single database or computing device or a plurality of databases or computing devices. In one embodiment, criteria 122 for determining whether an application is a misleading or fraudulent application may be stored in database 120.

Database 120 in FIG. 1 may represent a portion of one or more computing devices. For example, database 120 may represent a portion of computing device 202 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing device 202 in FIG. 2, computing system 510 in FIG. 5, and/or portions of exemplary network architecture 600 in FIG. 6.

Figure 2:
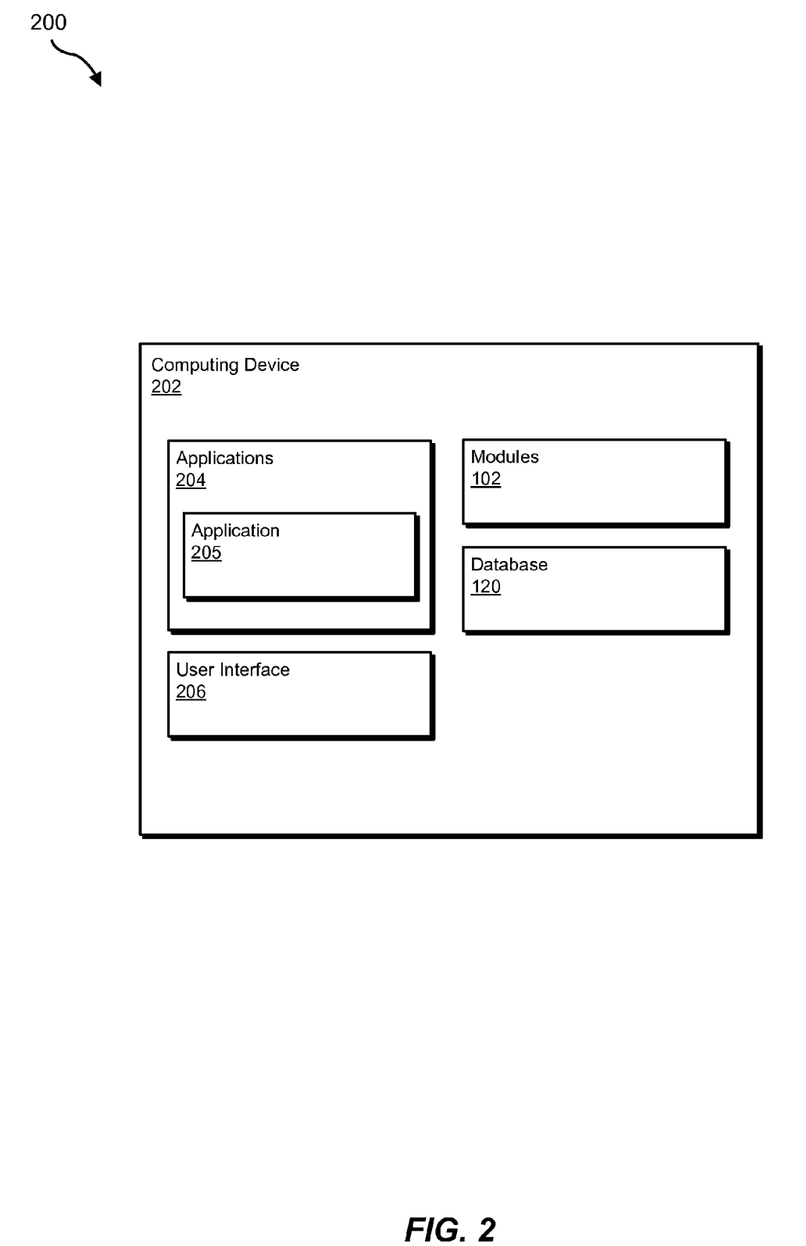
FIG. 2 is a block diagram of an exemplary system for detecting fraudulent software applications that generate misleading notifications according to an additional embodiment.

FIG. 2 is a block diagram of an exemplary computing device 202 that may be programmed to detect fraudulent software applications that generate misleading notifications. As illustrated in this figure, one or more applications 204 may be installed on computing device 202. Visual elements generated by such applications 204 may be displayed via a user interface 206. As explained above, modules 102 from FIG. 1 may be stored and configured to run on computing device 202. Computing device 202 may also comprise database 120 from FIG. 1.

As will be explained in greater detail below, computing device 202 may be programmed to detect fraudulent software applications that generate misleading notifications. For example, modules 102 in FIG. 1 may, when executed by a processor of computing device 202, cause computing device 202 to: 1) detect a notification (such as a taskbar-notification-area message) generated by an application (such as application 205) installed on computing device 202, 2) access or retrieve criteria 122 from database 120 for determining, based on characteristics of the notification and/or the application that generated the notification, whether the application represents a misleading or fraudulent application, 3) determine, by applying the criteria, that the application 205 represents a fraudulent or misleading application, and then 4) perform a security operation on the application (by, for example, removing or quarantining the application).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Figure 3:
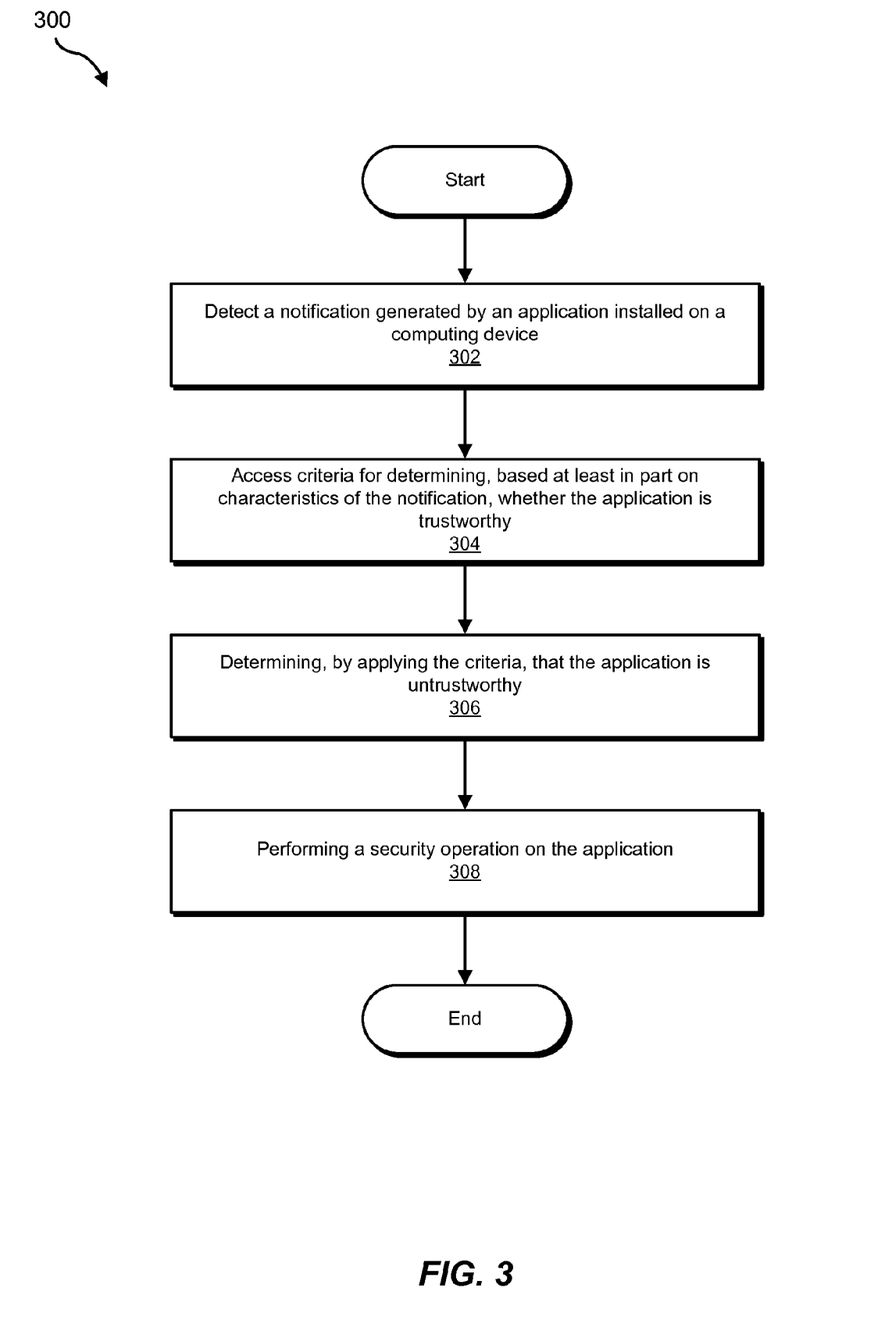
FIG. 3 is a flow diagram of an exemplary method for detecting fraudulent software applications that generate misleading notifications.
Figure 4:
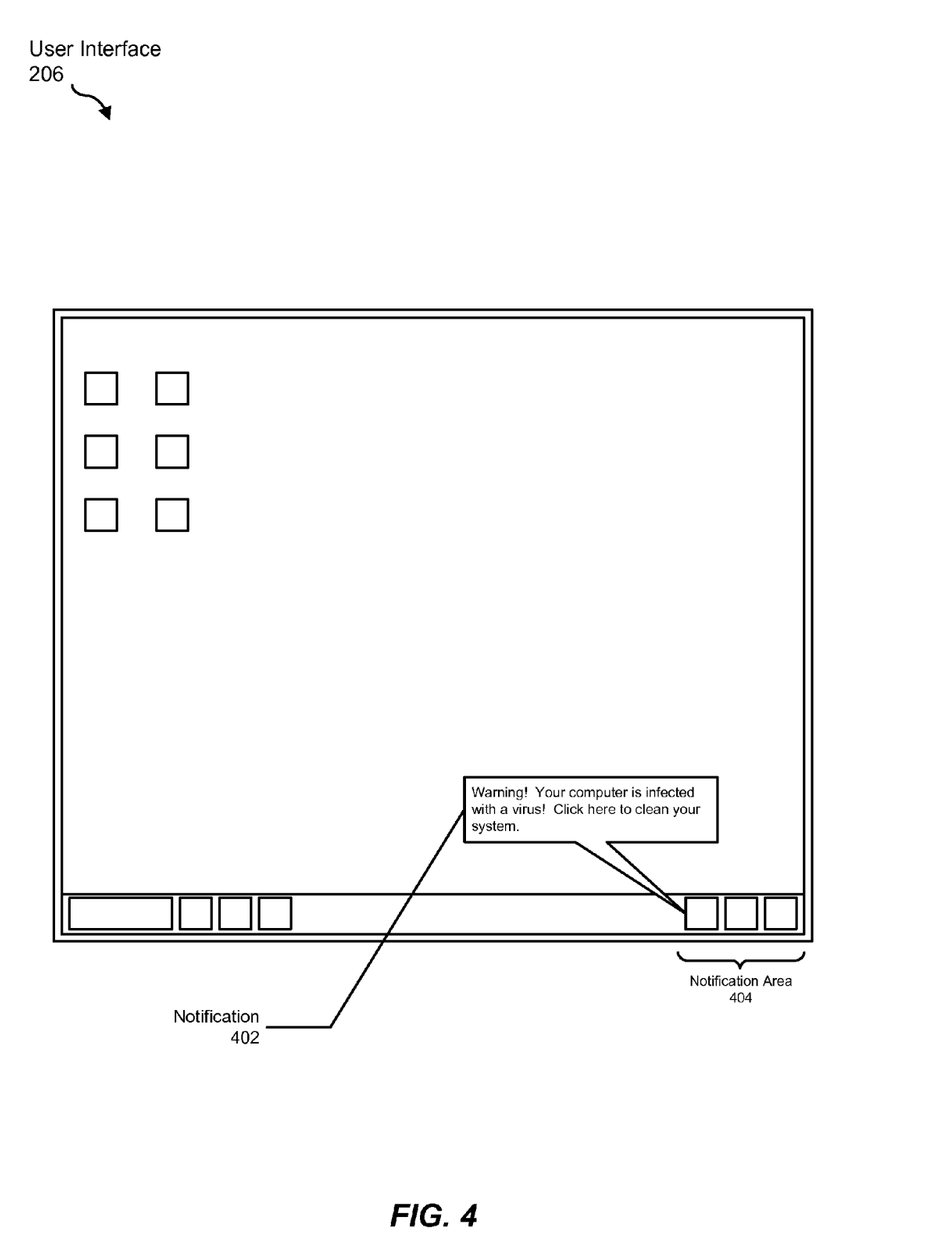
FIG. 4 is an illustration of an exemplary misleading notification generated by a fraudulent application.

FIG. 3 is a flow diagram of an exemplary computer-implemented method 300 for detecting fraudulent software applications that generate misleading notifications. As illustrated in this figure, at step 302 the system may detect a notification generated by an application installed on a computing device. For example, notification-detection module 104 in FIG. 1 (which may, as detailed above, be stored and configured to run on computing device 202 in FIG. 2) may detect a notification (such as notification 402 in FIG. 4) generated in the notification area 404 of user interface 206 by application 205.

Notification-detection module 104 in FIG. 1 may be programmed to detect a variety of forms of notifications. Examples of notifications that notification-detection module 104 may be programmed to detect include, without limitation, notifications displayed in the taskbar notification area (sometimes referred to as the "system tray") of an operating system (e.g., WINDOWS), HTML-based notifications displayed on the desktop of an operating system (e.g., the active desktop in MICROSOFT WINDOWS), pop-up notifications (including non-browser-generated pop-up notifications), or any other type of notification that may be generated by fraudulent or misleading applications.

Notification-detection module 104 in FIG. 1 may detect notifications in a variety of ways. In one example, notification-detection module 104 may monitor and detect notifications generated within areas of an operating system that are commonly used by fraudulent or misleading applications (such as the taskbar notification area and/or active desktop of an operating system). Upon detecting a notification generated in one of these areas, notification-detection module 104 may then identify an application that is responsible for generating the detected notification. For example, notification-detection module 104 in FIG. 1 may identify a process that is responsible for generating the detected notification 402 in FIG. 4 and then identify an application (such as application 205 in FIG. 2) that is associated with this identified process.

Returning to FIG. 3, at step 304 the system may access criteria for determining, based at least in part on characteristics of the notification detected in step 302, whether the application responsible for generating the detected notification is trustworthy. For example, trustworthiness-determination module 106 in FIG. 1 (which may, as detailed above, be stored and configured to run on computing device 202 in FIG. 2), may access criteria 122 (e.g., from database 120 in FIG. 1) for determining whether application 205 in FIG. 2 (which generated notification 402 in FIG. 4) represents a misleading or fraudulent application.

A variety of different criteria may be used to determine whether an application that generated a detected notification is trustworthy (i.e., whether the application represents a fraudulent, misleading, or rouge application). Examples of criteria that may be used to determine whether an application is trustworthy include, without limitation: 1) whether a notification generated by the application contains words or phrases (such as "virus," "warning," and "infected") that are commonly contained in messages generated by fraudulent or misleading applications, 2) whether a notification generated by the application contains a hyperlink to known-untrustworthy websites (e.g., websites that host malicious files or sell pirated or fraudulent software), 3) whether the application generated a notification within a short period of time (e.g., 30 seconds) after the application was installed, 4) whether the application originated from or was created by a potentially untrustworthy source (such as a web browser), 5) whether the application was installed in a location (such as the system directory or a browser directory) that is commonly used by or associated with fraudulent or misleading applications, 6) whether the application or a file associated with the application (e.g., the primary executable file associated with the application) contains at least one data pattern or string that is commonly used by or associated with fraudulent or misleading applications, 7) whether a digital certificate associated with the application has been signed by a trusted certificate authority (such as MICROSOFT), or any other criteria that may be used to determine whether an application represents a fraudulent or misleading application.

In some examples, two or more criteria may be combined to form a rule or heuristic. For example, a rule may stipulate that any message displayed within the taskbar notification area message that: 1) contains the words "infected" or "virus" and 2) is generated by an application that has not been digitally signed by a trusted certificate authority (such as MICROSOFT) may be convicted as a fraudulent or misleading application. In addition, a rule may stipulate that an application that: 1) was installed via a web browser and 2) generates taskbar-notification-area messages that contain the words "infected" or "virus" within a short period of time (e.g., 30 seconds) after the application has been installed may be convicted as a fraudulent or misleading application. Similarly, a rule may stipulate that an application that: 1) generates taskbar-notification-area messages and 2) contains a data pattern or string commonly associated with fraudulent or misleading applications may be convicted as a fraudulent or misleading application, thereby allowing system 100 to combine existing signature-based anti-virus technologies with behavior-based heuristics to improve the efficacy and accuracy (e.g., by reducing false positives) of both technologies.

In one example, the system may assign various weight values to one or more criteria. For example, the system may assign a low-weight value (e.g., 2, on a scale of 1 to 10) to criteria used to determine whether an application generates notifications within a short period of time (e.g., 30 seconds) after the application was installed. Alternatively, the system may assign a high-weight value (e.g., 8, on a scale of 1 to 10) to criteria used to determine whether a notification generated by an application contains words (such as "virus" and "infected") that are commonly contained in messages generated by fraudulent or misleading applications. In this example, the system may, by comparing the various characteristics of the notifications and/or the programs that are responsible for generating these notifications with their respective weight values, determine whether an application is likely a fraudulent or misleading application.

Returning to FIG. 3, at step 306 the system may determine, by applying the criteria retrieved or accessed in step 304, that the application is untrustworthy. For example, trustworthiness-determination module 106 in FIG. 1 may, by applying the criteria 122 retrieved from database 120 in FIG. 1, that application 205 in FIG. 2 (which, in this example, is responsible for generating notification 402 in FIG. 4) represents a fraudulent or misleading application.

Trustworthiness-determination module 106 in FIG. 1 may apply the criteria 122 retrieved or accessed from database 120 to the detected notification, the application that generated the notification, or both. For example, trustworthiness-determination module 106 may determine that application 205 in FIG. 2 represents a fraudulent or misleading applications since: 1) notification 402 contains the words "warning," "infected," and "virus," 2) application 205 has not been signed by a trusted certificate authority, and 3) notification 402 contains a hyperlink to a website known to offer fraudulent or pirated software.

Returning to FIG. 3, at step 308 the system may perform a security operation on the fraudulent or misleading application. For example, security module 108 in FIG. 1 may perform a security operation on application 205 in FIG. 2. The phrase "security operation," as used herein, generally refers to any security operation that may be performed on an undesirable application or file. Examples of security operations include, without limitation, terminating the application, removing the application from the computing device, blocking the application from generating network activity, quarantining the application, or any other security operation that may be performed on undesirable applications or files. In one example, security module 108 may transform at least one property or characteristic of computing device 202 in FIG. 2 by performing this security operation (e.g., by removing the misleading application from memory or storage of computing device 202). Upon completion of step 308, exemplary method 300 in FIG. 3 may terminate.

By detecting and applying criteria to applications that generate visual notifications to users, the systems and methods disclosed herein may enable security software to quickly and accurately detect and remove fraudulent or misleading applications from users' computing devices. In addition, by combining one or more signature-based and behavioral-based criteria, the systems and methods disclosed herein may improve the efficacy and accuracy of existing security-software solutions.

Figure 5:
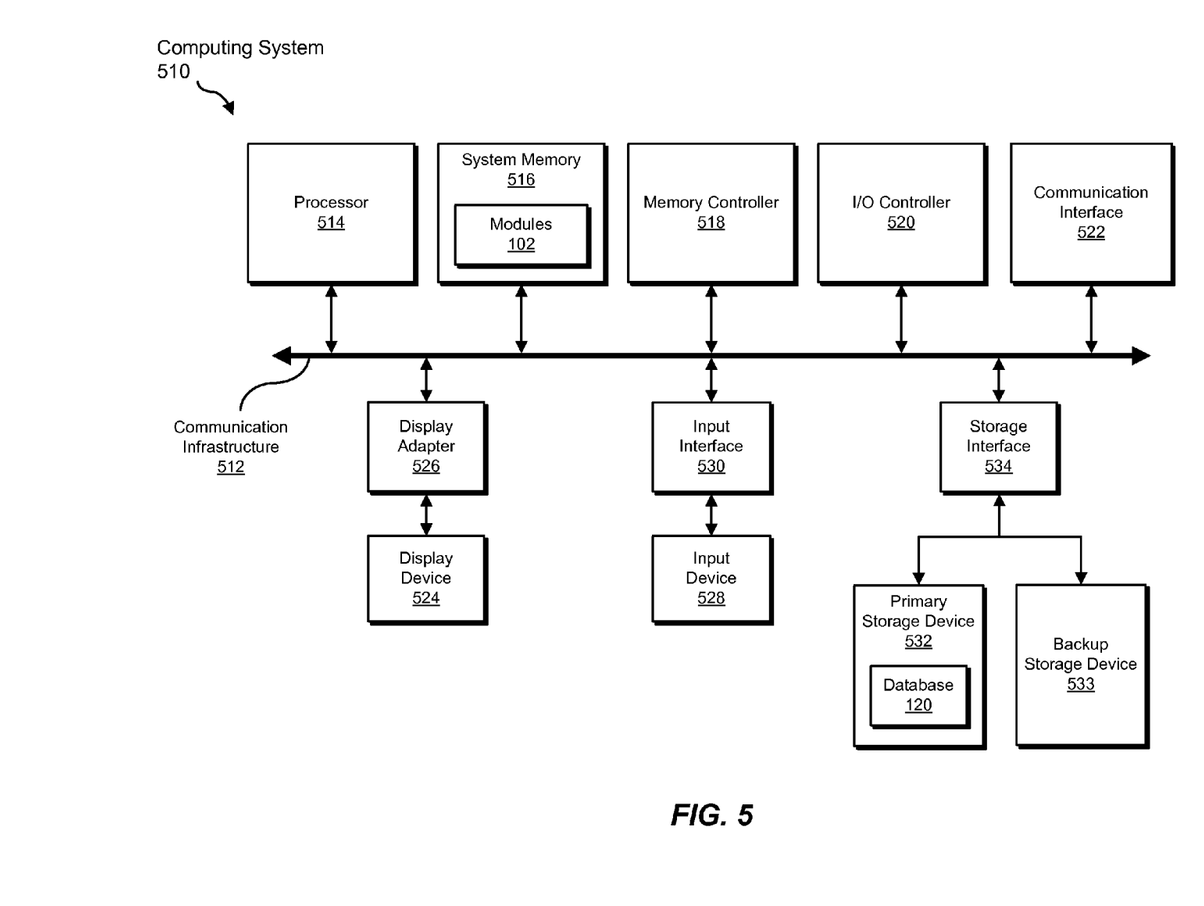
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the detecting, accessing, determining, performing, monitoring, applying, terminating, removing, quarantining, and blocking steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below). In one example, and as detailed above, modules 102 in FIG. 1 may be loaded into system memory 516.

In certain embodiments, exemplary computing system 510 may also comprise one or more components or elements in addition to processor 514 and system memory 516. For example, as illustrated in FIG. 5, computing system 510 may comprise a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as detecting, accessing, determining, performing, monitoring, applying, terminating, removing, quarantining, and blocking.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the detecting, accessing, determining, performing, monitoring, applying, terminating, removing, quarantining, and blocking steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 594 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the detecting, accessing, determining, performing, monitoring, applying, terminating, removing, quarantining, and blocking steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the detecting, accessing, determining, performing, monitoring, applying, terminating, removing, quarantining, and blocking steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, and as detailed above, database 120 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the detecting, accessing, determining, performing, monitoring, applying, terminating, removing, quarantining, and blocking steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
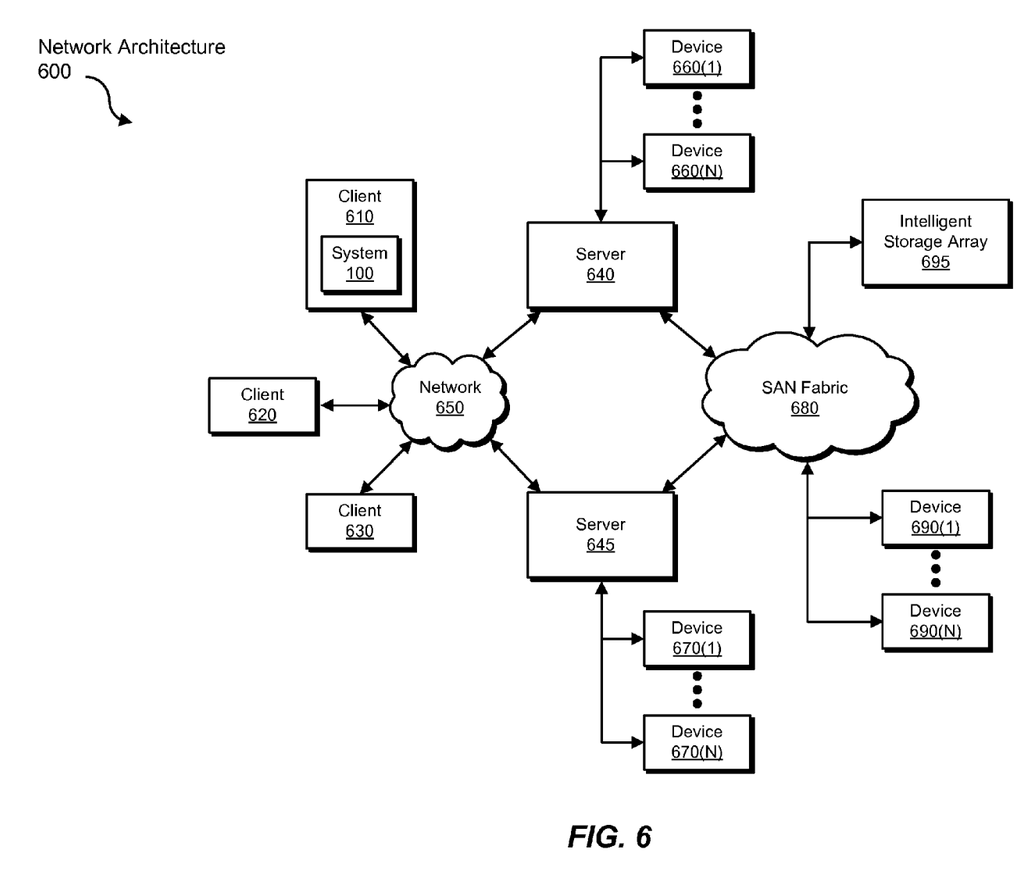
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may comprise system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the detecting, accessing, determining, performing, monitoring, applying, terminating, removing, quarantining, and blocking steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for detecting fraudulent software applications that generate misleading notifications. In one example, such a method may comprise: 1) detecting a notification generated by an application installed on the computing device, 2) accessing criteria for determining, based at least in part on characteristics of the notification, whether the application is trustworthy, 3) determining, by applying the criteria, that the application is untrustworthy, and then 4) performing a security operation on the application.

In one example, detecting the notification generated by the application may comprise detecting the notification and then determining that the application is responsible for generating the notification. In some examples, detecting the notification may comprise: 1) detecting a notification displayed in a taskbar notification area of an operating system running on the computing device, 2) detecting a notification displayed on an active desktop of the operating system, and/or 3) detecting a pop-up notification. The method may also comprise, prior to detecting the notification, monitoring the taskbar notification area and/or the active desktop of the operating system.

Examples of criteria that may be used include, without limitation, criteria for determining whether the notification contains words or phrases that are commonly associated with misleading applications, criteria for determining whether the notification contains a hyperlink to an untrustworthy website, criteria for determining whether the notification was generated within a predetermined period of time after the application was installed on the computing device, criteria for determining whether the application originated from a potentially untrustworthy source, criteria for determining whether the application was installed in a location on the computing device that is commonly associated with misleading applications, criteria for determining whether the application contains at least one data pattern that is commonly associated with misleading applications, criteria for determining whether a digital certificate associated with the application has been signed by a trusted certificate authority, or any other criteria that may be used to determine whether an application that generates notifications is untrustworthy. In some examples, applying the criteria comprises applying the criteria to the notification and/or the application.

In one example, performing the security operation on the application may comprise terminating the application, removing the application from the computing device, blocking the application from generating network activity, and/or quarantining the application.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting fraudulent software applications that generate misleading notifications, at least a portion of the method being performed by a computing device comprising at least one processor, the method comprising:

monitoring a system tray of an operating system running on the computing device;

detecting a non-browser-generated notification generated in the system tray;

upon detecting the non-browser-generated notification, identifying an application, installed on the computing device, that is responsible for generating the non-browser-generated notification;

accessing criteria for determining, based at least in part on characteristics of the non-browser-generated notification, whether the application represents a fraudulent application designed to generate misleading notifications that misrepresent the security status of computing devices, wherein the criteria stipulates that applications that generate non-browser-generated notifications on computing devices within a predetermined period of time after the applications are installed on the computing devices represent fraudulent applications designed to generate misleading notifications that misrepresent the security status of the computing devices;

determining, by applying the criteria to the non-browser-generated notification generated by the application, that:
the non-browser-generated notification represents a misleading notification designed to misrepresent the security status of the computing device;
the application is a fraudulent application;

performing a security operation on the application.

2. The method of claim 1, wherein the criteria further comprises criteria for determining whether the application contains at least one data pattern that is commonly associated with misleading applications.

3. The method of claim 1, wherein:
identifying the application comprises:
upon detecting the non-browser-generated notification, identifying a process that is responsible for generating the non-browser-generated notification;
identifying the application by determining that the application is associated with the responsible process.

4. The method of claim 1, wherein:
the method further comprises applying, via a trustworthiness-determination module, the criteria to the application;
the trustworthiness-determination module is configured to apply criteria to applications, installed on the computing device, that generate visual notifications to users;
applying the criteria to the application comprises applying the criteria to the application in response to determining that the application represents an application, installed on the computing device, that generates visual notifications to users.

5. The method of claim 1, wherein the criteria further comprises at least one of:
criteria for determining whether the non-browser-generated notification contains words or phrases that are commonly associated with misleading applications;
criteria for determining whether the non-browser-generated notification contains a hyperlink to an untrustworthy website;
criteria for determining whether the application originated from a potentially untrustworthy source;
criteria for determining whether a digital certificate associated with the application has been signed by a trusted certificate authority.

6. The method of claim 1, wherein the criteria further comprises criteria for determining whether the application was installed in a location on the computing device that is commonly associated with misleading applications.

7. The method of claim 1, wherein performing the security operation on the application comprises at least one of:
terminating the application;
removing the application from the computing device;
blocking the application from generating network activity;
quarantining the application.

8. A system for detecting fraudulent software applications that generate misleading notifications, the system comprising a device storing a plurality of modules, including:
a notification-detection module programmed to:
monitor a system tray of an operating system running on a computing device;
detect a non-browser-generated notification generated in the system tray;
upon detecting the non-browser-generated notification, identify an application, installed on the computing device, that is responsible for generating the non-browser-generated notification;
a trustworthiness-determination module programmed to:
access criteria for determining, based at least in part on characteristics of the non-browser-generated notification, whether the application represents a fraudulent application designed to generate misleading notifications that misrepresent the security status of computing devices, wherein the criteria stipulates that applications that generate non-browser-generated notifications on computing devices within a predetermined period of time after the applications are installed on the computing devices represent fraudulent applications designed to generate misleading notifications that misrepresent the security status of the computing devices;
determine, by applying the criteria to the non-browser-generated notification generated by the application, that:
the non-browser-generated notification represents a misleading notification designed to misrepresent the security status of the computing device;
the application is a fraudulent application;
a security module programmed to perform a security operation on the application;
at least one processor configured to execute the notification-detection module, the trustworthiness-determination module, and the security module.

9. The system of claim 8, wherein the criteria further comprises criteria for determining whether the application contains at least one data pattern that is commonly associated with misleading applications.

10. The system of claim 8, wherein the notification-detection module is programmed to identify the application by:
upon detecting the non-browser-generated notification, identifying a process that is responsible for generating the non-browser-generated notification;
identifying the application by determining that the application is associated with the responsible process.

11. The system of claim 8, wherein the criteria further comprises criteria for determining whether the application was installed in a location on the computing device that is commonly associated with misleading applications.

12. The system of claim 8, wherein the criteria further comprises at least one of:
criteria for determining whether the non-browser-generated notification contains words or phrases that are commonly associated with misleading applications;
criteria for determining whether the non-browser-generated notification contains a hyperlink to an untrustworthy website;
criteria for determining whether the application originated from a potentially untrustworthy source;
criteria for determining whether a digital certificate associated with the application has been signed by a trusted certificate authority.

13. The system of claim 8, wherein the trustworthiness-determination module applies the criteria by applying the criteria to the application.

14. The system of claim 8, wherein the security module performs the security operation by at least one of:
terminating the application;
removing the application from the computing device;
blocking the application from generating network activity;
quarantining the application.

15. A non-transitory computer-readable-storage medium comprising one or more computer-readable instructions that, when executed by a computing device comprising at least one processor, cause the computing device to:

monitor a system tray of an operating system running on the computing device;

detect a non-browser-generated notification generated in the system tray;

upon detecting the non-browser-generated notification, identify an application, installed on the computing device, that is responsible for generating the non-browser-generated notification;

access criteria for determining, based at least in part on characteristics of the non-browser-generated notification, whether the application represents a fraudulent application designed to generate misleading notifications that misrepresent the security status of computing devices, wherein the criteria stipulates that applications that generate non-browser-generated notifications on computing devices within a predetermined period of time after the applications are installed on the computing devices represent fraudulent applications designed to generate misleading notifications that misrepresent the security status of the computing devices;

determine, by applying the criteria to the non-browser-generated notification generated by the application, that:
the non-browser-generated notification represents a misleading notification designed to misrepresent the security status of the computing device;
the application is a fraudulent application;

perform a security operation on the application.

16. The computer-readable-storage medium of claim 15, wherein the criteria further comprises criteria for determining whether the application contains at least one data pattern that is commonly associated with misleading applications.

17. The computer-readable-storage medium of claim 16, wherein the one or more computer-readable instructions further cause the computing device to identify the application by:

upon detecting the non-browser-generated notification, identifying a process that is responsible for generating the non-browser-generated notification;

identifying the application by determining that the application is associated with the responsible process.

18. The computer-readable-storage medium of claim 15, wherein the criteria further comprises at least one of:

criteria for determining whether the non-browser-generated notification contains words or phrases that are commonly associated with misleading applications;

criteria for determining whether the non-browser-generated notification contains a hyperlink to an untrustworthy website;

criteria for determining whether the application originated from a potentially untrustworthy source;

criteria for determining whether a digital certificate associated with the application has been signed by a trusted certificate authority.

19. The computer-readable-storage medium of claim 15, wherein the criteria further comprises criteria for determining whether the application was installed in a location on the computing device that is commonly associated with misleading applications.

20. The computer-readable-storage medium of claim 15, wherein the security operation comprises at least one of:

terminating the application;

removing the application from the computing device;

blocking the application from generating network activity;

quarantining the application.

* * * * *